United States Patent [19]
Wilson

[11] 3,964,628
[45] June 22, 1976

[54] COOKING PAN

[75] Inventor: James D. Wilson, Newport Beach, Calif.

[73] Assignee: Banner Metals Division of Intercole Automation, Inc., Compton, Calif.

[22] Filed: Jan. 14, 1975

[21] Appl. No.: 540,816

[52] U.S. Cl. .......................... 220/19; 220/DIG. 25; 206/72; 206/513; 206/518; 99/448
[51] Int. Cl.² ...................... B65D 7/20; B65D 1/34
[58] Field of Search ............... 220/19; 206/72, 513, 206/518; 99/448

[56] References Cited
UNITED STATES PATENTS

| | | | |
|---|---|---|---|
| 2,718,325 | 9/1955 | Dales | 220/19 |
| 3,333,722 | 8/1967 | Panknin | 220/19 |
| 3,677,172 | 7/1972 | Wilson | 99/448 |

*Primary Examiner*—William Price
*Assistant Examiner*—Douglas B. Farrow
*Attorney, Agent, or Firm*—Keith D. Beecher

[57] ABSTRACT

A cooking pan assembly is provided which has particular utility in the industrial cooking of food, such as tuna fish. The cooking pan is particularly constructed so that it may conveniently be transported on usual conveyors within the cooking facility. Crimped wire-formed ends are provided for the pan which serve as handles and which prevent the contents of the pan from sliding through the front or rear ends thereof. The wire-formed ends are crimped loosely to the side walls and bottom of the pan for sanitary reasons so that there is only a point contact between the wire-formed ends and the sides and bottoms, and no areas are formed which would be conducive to build up of bacteria. There are no welds between the end members and the bottom or side walls of the pan, since such welds would produce two separate surfaces in intimate contact with one another which could harbor bacteria. The pan assembly is easy to clean thoroughly by a simple spray wash since there are no nooks or crannies in the assembly.

5 Claims, 5 Drawing Figures

U.S. Patent   June 22, 1976   3,964,628
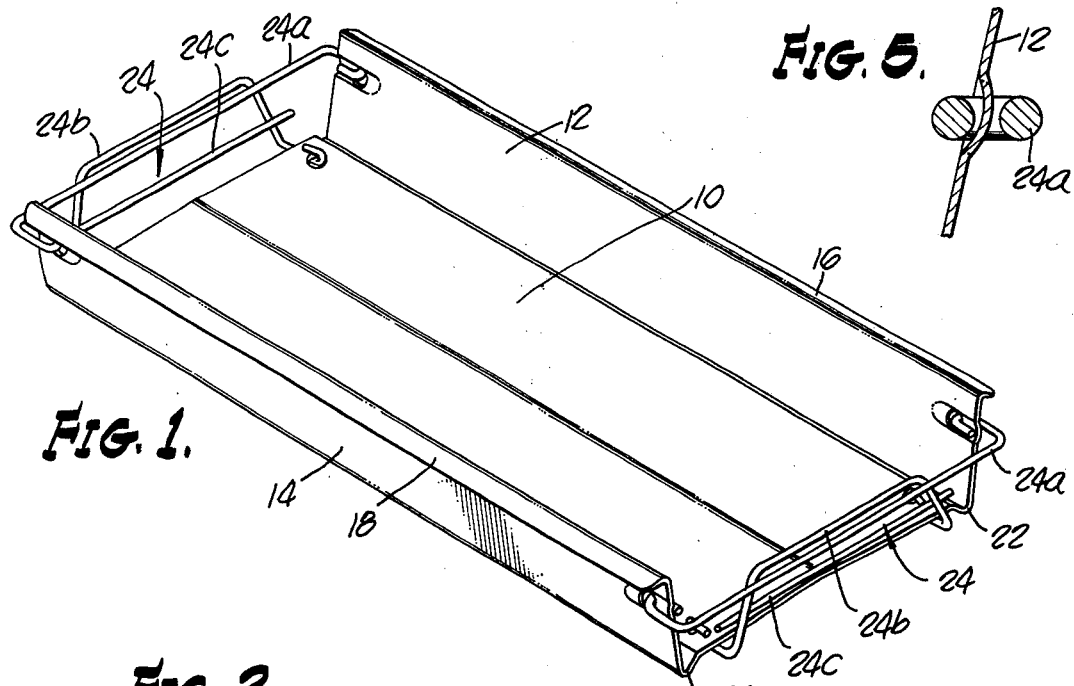
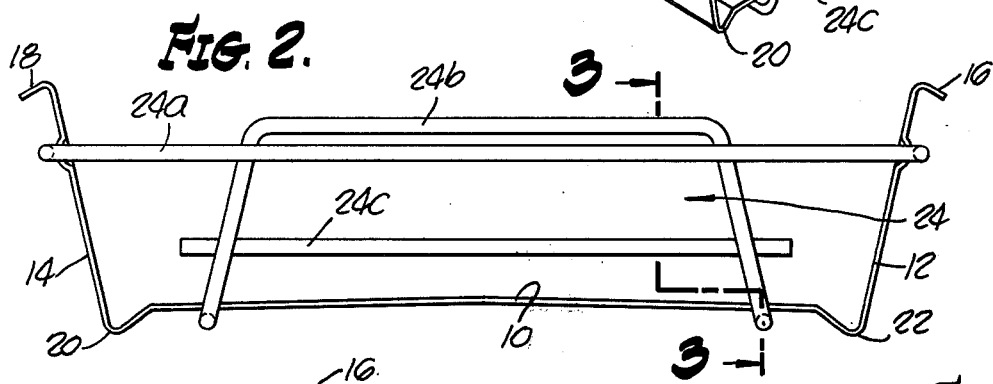
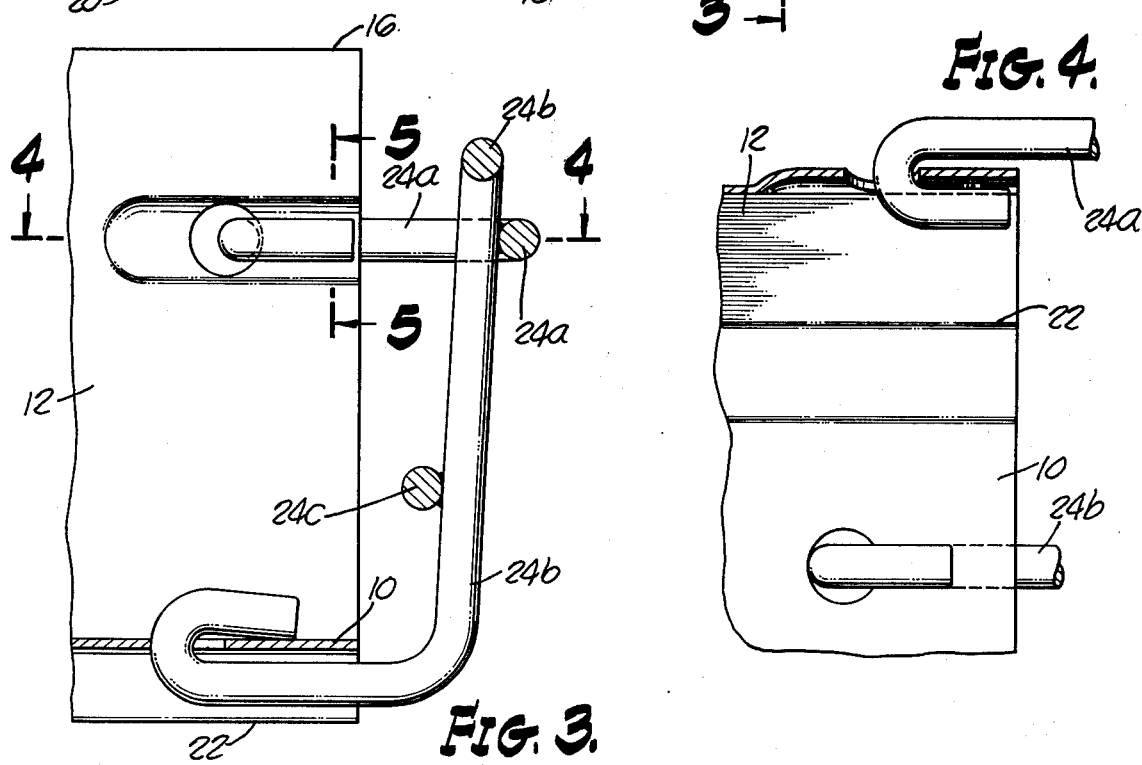

ns,628

COOKING PAN

BACKGROUND OF THE INVENTION

The cooking pan assembly of the invention may be used in conjunction with the rack described in U.S. Pat. No. 3,677,172 which issued July 18, 1972 in the name of the present inventor, and which is assigned to the present Assignee.

As described in the patent, tuna fish must be pre-cooked before it is canned, and the pre-cooking of tuna is normally carried out in a pressure chamber using steam heat. The steam heat has the double effect of cooking the tuna, and of also causing fish oils to be produced. The fish oils are used, for example, in the manufacture of vitamin pills, and also in the paint industry. In the past, it has been the usual practice in the industry to cook the tuna in wire baskets supported on large racks in appropriate cooking ovens. However, as explained in the patent, such prior art racks and baskets are wasteful of space and are difficult to clean. Also, the cooked fish has a tendency to stick to the wires of the baskets resulting in substantial wastage.

The pans described in the patent are preferably made of stainless sheets, rather than wire, and the use of appropriate release agents was suggested in the patent, such as palm oil or lecithin, to prevent the fish from sticking to the surface of the pan. The pans described in the patent were constructed to have a crown-shaped bottom which defined troughs or gutters at the sides thereof to collect the fish oils produced during the cooking process.

It was found that the stainless steel pans described in the patent provided adequate heat circulation to the fish being cooked therein, and that they also provided adequate means for drawing off the fish oils produced during the cooking process.

The pan of the present invention has all of the features of the pans described in Pat. No. 3,677,172, and, likewise, is constructed of sheet metal, such as stainless steel. The bottom of the pan of the present invention, however, is constructed to define a lower surface which is essentially flat, and which has two side rails extending along the side edges thereof from one end of the pan to the other, so as to facilitate the transport of the pans on usual conveyors within the cooking plant.

The pans of the present invention are also constructed to define troughs at each side of the upper surface of the bottom, and which extend from one end of the pan to the other to drain off the fish oils. Moreover, the pans of the present invention have wire-formed ends which serve as handles and barriers for the contents of the pans, and which are crimped loosely to the bottoms and sides of the pans so as to avoid the formation of bacteria-accumulating areas, and to enable the pans to be cleaned and washed thoroughly by a simple spray operation.

BRIEF DESCRIPTION OF THE DRAWINGS

FIG. 1 is a perspective view of a pan representing one embodiment of the invention, the view being taken from above and slightly to the front of the pan;

FIG. 2 is a front elevational view of the pan of FIG. 1;

FIG. 3 is a section taken along the line 3—3 of FIG. 2, and showing particularly the manner in which a wire-formed end member is crimped to the sides and bottom of the pan;

FIG. 4 is a section taken along the lines 4—4 of FIG. 3, and further showing the manner in which the wire-formed end member is crimped to the sides and bottom of the pan; and FIG. 5 is a section taken along the line 5—5 of FIG. 4.

DETAILED DESCRIPTION OF THE ILLUSTRATED EMBODIMENT

The cook pan shown in FIGS. 1–5 comprises a rectangular shaped rigid sheet-like member formed, for example, of stainless steel. The sheet-like member defines a bottom 10, and it also has turned-up portions at the respective side edges of the bottom which define side members 12 and 14. The upper edges of the side members 12 and 14 are bent outwardly to form flanges 16 and 18 so as to permit the pan to be supported in racks of the type described in the aforesaid patent.

The sheet-like material is configured to form troughs at the side edges of the upper surface of the bottom which extend from one end of the pan to the other. The upper surface of bottom 10 is inclined slightly from the central longitudinal axis to the sides so that oils formed during the cooking process will flow into the side troughs and be drained through the ends of the pan into appropriate receptacles. However, the bottom surface at the underside of the pan is generally flat so that the pan may conveniently be carried on usual conveyors for transportation within the cooking facility. As best shown in FIG. 2, the side troughs form downwardly extending side rails 20 and 22 on the underside of the pan which extend along the respective side edges of the bottom from one end to the other.

A wire-formed member 24 is provided at each end of the pan, and these wire-formed end members provide handles for the pan, and they also provide barriers to prevent the contents of the pan from sliding through the ends thereof. Each wire-formed member includes a first wire rod 24a which extends transversely across the end of the pan and which is bent to have a generally U-shaped configuration. The ends of the wire rod 24a are crimped in oversize holes in the ends of the side members 12 and 14, so that the wire rods form a loose, sliding fit with the side members in a point contact relationship, so as to minimize the formation of any area which could harbor bacteria.

Each of the wire-formed end members also includes a generally U-shaped upright wire rod 24b which is welded to the wire rod 24a, and which has its ends crimped to the corresponding end of the bottom 10 in oversize holes, likewise, to form point contacts with the bottom. A third straight wire rod 24c may also be provided which extends across the rod 24b in spaced and parallel relationship with the rod 24a, and which likewise is welded to the rod 24b.

The invention provides, therefore, an improved cooking pan assembly which is particularly suited for the industrial cooking of fish, such as tuna. As described above, the cooking pan of the invention is constructed to be conveniently carried on conveyors within the cooking facility, and to be suspended on racks within the cooking ovens. The cooking pan is constructed to assure that no bacteria-harboring areas are provided, and so that it may easily be cleaned by a simple spray wash.

While a particular embodiment of the invention has been shown and described, modifications may be made. It is intended in the claims to cover the modifications which come within the true spirit and scope of the invention.

What is claimed is:

1. A cooking pan comprising: a rectangular rigid sheet-like member defining a bottom for the pan and having a pair of turned-up portions at the respective side edges thereof defining side members for the pan; and a wire-formed member at each end of the pan loosely crimped into oversize holes in the ends of the bottom and of the side members, each wire-formed member including a first wire rod extending transversely across the end of the pan and having its ends crimped into oversize holes in the ends of the side members so that the wire rod forms a loose, sliding fit with the side members in a point contact relationship, and each wire-formed end member including a further wire rod which has its ends crimped into oversize holes in the bottom to form point contacts with the bottom, so as to minimize the formation of any area which could harbor bacteria.

2. The cooking pan defined in claim 1, in which the sheet-like member is shaped to define troughs extending from one end to the other of the bottom at the respective side edges thereof.

3. The cooking pan defined in claim 2, in which the troughs form downwardly-extending side rails on the underside of the bottom extending along the respective side edges thereof.

4. The cooking pan defined in claim 3, in which the lower surface of the bottom between the side rails is generally flat.

5. The cooking pan defined in claim 1, in which the sheet-like member is formed of stainless steel.

* * * * *